(12) United States Patent
Walsh

(10) Patent No.: US 9,227,377 B2
(45) Date of Patent: Jan. 5, 2016

(54) MESH STRUCTURE, PRODUCTION AND USES THEREOF

(71) Applicant: Tensar Technologies Limited, Blackburn (GB)

(72) Inventor: Anthony Thomas Walsh, Lancashire (GB)

(73) Assignee: TENSAR TECHNOLOGIES LIMITED, Blackburn (GB)

( * ) Notice: Subject to any disclaimer, the term of this patent is extended or adjusted under 35 U.S.C. 154(b) by 0 days.

(21) Appl. No.: 13/661,708

(22) Filed: Oct. 26, 2012

(65) Prior Publication Data

US 2013/0115415 A1    May 9, 2013

Related U.S. Application Data

(60) Provisional application No. 61/552,717, filed on Oct. 28, 2011.

(30) Foreign Application Priority Data

Oct. 28, 2011   (GB) .................................. 1118659.0

(51) Int. Cl.
| | | |
|---|---|---|
| *B32B 3/24* | (2006.01) | |
| *B32B 3/26* | (2006.01) | |
| *B29D 28/00* | (2006.01) | |
| *B32B 3/30* | (2006.01) | |
| *E02D 3/00* | (2006.01) | |

(52) U.S. Cl.
CPC ................ *B32B 3/266* (2013.01); *B29D 28/00* (2013.01); *B32B 3/30* (2013.01); *E02D 3/005* (2013.01); *Y10T 428/24273* (2013.01)

(58) Field of Classification Search
CPC .... B32B 3/266; B32B 3/30; Y10T 428/24273
USPC .................................. 428/133, 134, 135, 136
See application file for complete search history.

(56) References Cited

U.S. PATENT DOCUMENTS

| | | | | |
|---|---|---|---|---|
| 4,374,798 | A | * | 2/1983 | Mercer ...................... 264/288.8 |
| 5,053,264 | A | * | 10/1991 | Beretta ......................... 428/131 |
| 5,269,631 | A | | 12/1993 | Mercer et al. |

FOREIGN PATENT DOCUMENTS

| | | |
|---|---|---|
| EP | 0 198 704 | 10/1986 |
| EP | 0 374 365 | 6/1990 |
| EP | 0 515 233 | 11/1992 |
| GB | 2 035 191 | 6/1980 |

(Continued)

*Primary Examiner* — William P Watkins, III
(74) *Attorney, Agent, or Firm* — Jacobson Holman, PLLC.

(57) ABSTRACT

A one-piece plastics material mesh structure, particularly a geogrid, is produced by stretching a plastics sheet starting material formed with an array of holes and comprises a plurality of generally parallel rib structures extending longitudinally in a first direction parallel to the stretch direction and a plurality of generally parallel bar structures extending in a second direction transverse to the rib structures. The rib structures and said bar structures are interconnected by junctions. The rib structures have rib segments oriented in the first direction along their lengths and orientation in this direction extends across the junctions connecting two such oriented rib segments. The bar structures are such that their overall stretch ratio in the second direction is a maximum of 1 and all locations along the length of the bar structures have a maximum orientation of 1.5 in the second direction.

40 Claims, 10 Drawing Sheets

(56) References Cited

FOREIGN PATENT DOCUMENTS

| GB | 2 073 090 | 10/1981 |
| GB | 2 096 531 | 10/1982 |
| GB | 2 108 896 | 5/1983 |
| GB | 2 124 965 | 2/1984 |
| GB | 2 174 332 | 11/1986 |
| GB | 2 256 146 | 12/1992 |
| GB | 2 295 353 | 5/1996 |

* cited by examiner

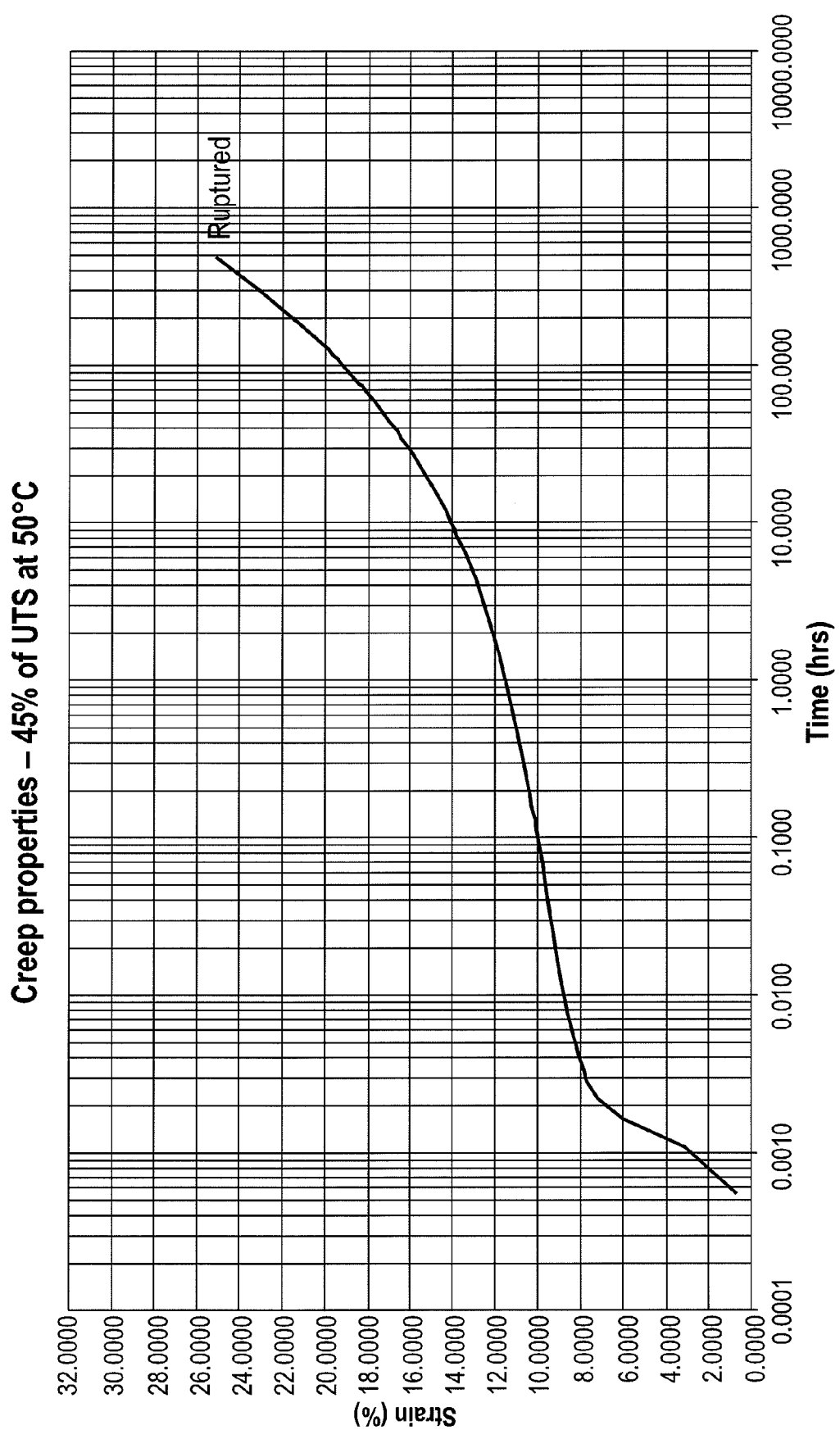

MESH STRUCTURE, PRODUCTION AND USES THEREOF

This is a complete application claiming benefit of provisional No. 61/552,717, filed Oct. 28, 2011, which has a priority of Great Britain no. 1118659.0, filed Oct. 28, 2011, hereby incorporated by reference.

The present invention relates to plastics mesh structures (and particularly but not exclusively geogrids) of the type produced by stretching a plastics sheet starting material formed with an array of holes so that the mesh structure obtained comprises a plurality of generally parallel rib structures extending longitudinally in the stretch direction and a plurality of generally parallel bar structures extending transversely to the rib structures, said rib structures and said bar structures being interconnected by junctions at spaced locations along their respective lengths whereby the rib structures are sub-divided along their length into alternating junctions and rib segments (or strands) and the bar structures are sub-divided along their lengths by alternating bar segments and junctions. For convenience such a mesh structure is also referred to herein as "a mesh structure of the kind defined". The invention also relates to methods of producing and uses of such structures.

Geogrids are used to strengthen or reinforce particulate material (e.g. soil or aggregate) in geoengineering constructions. More particularly the geogrid is embedded in the particulate material of the construction so that this material can then lock into the open meshes of the geogrid. The thickness of a geogrid, as measured at the junction, is usually greater than 0.5 mm, or 0.75 mm and may well be greater than about 1.00 mm or 1.5 mm or 2.00 mm.

Geogrids can be manufactured in many different ways, for instance by stitch bonding fabrics made of for instance polyester filaments and applying a flexible coating such as a PVC or bitumen coating, or by weaving or by knitting, or even joining oriented plastic strands together. However the present invention is concerned with geogrids (and other mesh structures) which are formed by stretching a plastics sheet starting material which has been provided with an array of holes (e.g. on a rectangular or other suitable grid pattern) which form meshes in the final product.

The stretching operation provides molecular orientation of the polymer in the stretching direction. The degree of orientation is usually represented by the "stretch ratio" which is the ratio of the distance between two points on the surface of the geogrid as compared to the distance between the corresponding points on the starting materials (i.e. prior to stretching). Stretch ratios may be determined by means of "truth lines" which are lines applied (normally by printing or drawing) to the starting material, usually in two perpendicular directions. Orientation at a particular location can be determined as the stretch ratio between two reference points, one on each of two truth lines positioned either side of the location where the orientation is to be measured, said reference points being closely adjacent to said location. Truth lines are generally only used for experimental work and not production runs.

Geogrids produced by stretching of such plastics sheet starting materials may be uniaxially or biaxially oriented. In the case of a uniaxially oriented ("uniax") geogrid stretching has been effected in only a single direction whereas a biaxially oriented "biax" grid has been produced by employing two stretching operations transverse to each other, the operations usually being perpendicular to each other and generally sequential. Such techniques for producing uniax and biax mesh structures by stretching a plastics sheet starting material in one direction (for a uniax product) or two directions (for a biax product) are disclosed, for example, in GB-A-2 035 191 (equivalent to U.S. Pat. No. 4,374,798) and EP-A-0 374 365 (equivalent to U.S. Pat. No. 5,053,264).

By way of further background, GB-A-2 124 965 discloses production of a biaxially orientated mesh structure using a stretching operation in a single direction. The starting material for this process has parallel side-by-side main zones separated by lines of holes or depressions. The starting material is drawn parallel to the main zones without lateral contraction so as to stretch the main zones into continuous oriented main strands (extending longitudinally of the mesh structure) interconnected by transverse, smaller cross-section strands which have been formed from the zones (the "transverse strand forming zones") between holes or depressions in each line. These latter zones are of narrow width (as measured in a direction parallel to the main zones) with the consequence that they are drawn out transversely to the main zones as a result of these main zones decreasing in width as they are stretched. The resulting transverse, smaller cross-section strands have significant orientation along their lengths (i.e. transverse to the main zones). By way of illustration, the exemplary embodiments of Examples 1 to 4 of GB-A-2 124 965 use plastics sheet starting materials with "transverse strand forming zones" having widths in the direction parallel to the main zones of 0.8 mm, 1.525 mm, 0.8 mm and 1.65 mm respectively. The calculated stretch ratios of the transverse, smaller cross-section strands as measured in a direction transverse to the main zones are 3.03:1, 2.26:1, 4.06:1 and 2.58:1 respectively.

Considering the production of uniax geogrids in more detail, the array of holes in the plastics sheet starting material may be considered to be comprised of first rows of holes extending in a first direction and second of rows of holes extending in a second direction which is transverse (and generally perpendicular) to the first direction. In the production of the uniax geogrid, the plastics sheet starting material is stretched parallel to the first direction. This results in the formation of the aforementioned rib structures from areas of the starting material between adjacent first rows of holes and formation of the bar structures from areas of material between adjacent second rows of holes. Additionally, the strands (or rib segments) are formed by stretching notional "strand forming zones" which are the areas of the starting material between adjacent holes in the second rows. The strands (or rib segments) formed by this stretching operation are moleculary oriented in the stretch direction.

Uniax grids are extensively used in applications where the stress is primarily in one direction, for instance when reinforcing embankments or modular block retaining walls. In such structures, stresses are transferred from the particulate material being reinforced along the rib structures and into the bars. It is, of course, the molecular orientation of the rib segments along their lengths which render uniax geogrids suitable for use in reinforcement applications where the stress is primarily in one direction.

Typically, uniax geogrids are such that, as determined in the length direction of a rib structure, the stretch ratio at the mid-point of a strand (or rib segment) is about 8:1. Typically also the bar segments in a conventional uniax geogrid have a width of 16 mm to 20 mm as measured in a direction parallel to the length of the rib structures, and are comprised of substantially unoriented polymer. More specifically, the polymer is substantially unoriented along the length and width of the bar segments and is similarly so at the junction when considered both along the length of the rib structure and the length of the bar structure. It will be appreciated that the weight of unoriented polymer in the transverse bar structure can represent a significant percentage of the overall weight of the uniax geogrid. Thus when one considers that the most efficient use of polymer in geogrids is that which is oriented in the strands (as this provides increased mechanical properties and reduced weight) it will be appreciated that the relatively significant amount of unoriented polymer in the bar structures (bar segments and junctions) provides for a lowering of the efficiency of the geogrid. Attempts have been made to overcome this disadvantage by simply reducing the number of transverse bar structures per unit length of the geogrid. Although the number of bar structures per unit length has reduced, the width of these bar structures (as measured in a direction parallel to the longitudinal extent of the ribs) has remained relatively static in the region of 16 to 20 mm. Such a width satisfies two requirements. Firstly, it allows the bar segments of the geogrid to be connected to a block wall of a geoengineering structure by means of conventionally available connectors. Secondly, the width is such that the bars are unlikely to break before the rib segments.

It is therefore an object of the present invention to obviate or mitigate the above mentioned disadvantages.

According to a first aspect of the present invention there is provided a one-piece plastics material mesh structure produced by stretching a plastics sheet starting material formed with an array of holes wherein the mesh structure comprises a plurality of generally parallel rib structures extending longitudinally in a first direction parallel to the stretch direction and a plurality of generally parallel bar structures extending in a second direction transverse to the rib structures, said rib structures and said bar structures being interconnected by junctions at spaced locations along their respective lengths whereby the rib structures are sub-divided along their length into alternating junctions and rib segments and the bar structures are sub-divided along their lengths by alternating bar segments and junctions, wherein:

(a) the rib structures are such that the rib segments are oriented in the first direction along their lengths and orientation in the first direction extends across the junctions connecting two such oriented rib segments, and (b) the bar structures are such that their overall stretch ratio in the second direction is a maximum of 1 and all locations along the length of the bar structures have a maximum orientation of 1.5 in the second direction.

According to a second aspect of the present invention there is provided a method of producing a one piece plastics material mesh structure comprising:

(i) providing a plastics sheet starting material having holes arranged on a regular grid pattern such that there are parallel first rows of holes in a first direction and parallel second rows of holes in a second direction transverse to the first direction, whereby said starting material has bar structure forming zones defined between the adjacent rows of second holes and rib structure forming zones defined between adjacent first rows of holes and (ii) stretching said material in the first direction (preferably under conditions such that there is a maximum of 15% contraction in the second direction) to produce a mesh structure comprised of a plurality of generally parallel, longitudinal rib structures extending parallel to the first direction and a plurality of generally parallel bar structures extending parallel to the second direction, said rib structures and bar structures being interconnected by junctions at spaced locations along their respective lengths whereby the rib structures are subdivided along their length into alternating junctions and rib segments and the bar structures are sub-divided along their length into alternating bar segments and junctions, wherein the width (in the stretch direction) of the bar structure forming zones and the degree of stretch produced a mesh structure in which:

(a) the rib structures are such that the rib segments are oriented in the first direction along their lengths and orientation in the first direction extends across the junctions connecting two such oriented rib segments, and (b) the bar structures are such that their overall stretch ratio in the second direction is a maximum of 1 and all locations along the length of the bar structures have a maximum orientation of 1.5 in the second direction.

Generally the first and second directions are mutually perpendicular to each other.

Preferably the stretching in the first direction is the only stretching operation employed in the production of the mesh structure, and there is no stretching in the second direction.

Although the invention is generally applicable to one piece plastics mesh structures (and methods for their production), it has particular application to such structures in the form of uniax geogrids.

Uniax geogrids (and other mesh structures) of the invention are such that orientation in the first (i.e. stretch) direction extends not only along the rib segments but also across the junctions connecting adjacent rib segments, whereby the rib structures have orientation along their entire length. Preferably the degree of orientation in the stretch direction at the mid-points of the junctions is significant compared to that at the mid-points of the adjacent rib segments connected by the junctions. As conventional, orientation may be determined by measurement of stretch ratios which, for the purposes of the invention, are as measured cold after releasing the stretching force (and after any annealing is carried out), the stretch ratio being measured on the surface of the mesh structure.

Preferred unix geogrids of the invention are such that, as measured in the longitudinal direction of the rib structures (i.e. the "first direction"), the stretch ratio at the mid-point of the junctions is at least about 20% of that at the mid-points of the adjacent rib segments. More preferably, the stretch ratio (measured on the same basis) at the mid-point of the junctions as compared to that at the mid-points of the adjacent rib segments is somewhat higher than this figure of about 20%. For preference, the percentage is at least about 30%, more preferably at least about 40%, even more preferably at least about 50% and ideally at least about 55%. By way of example, this percentage may in certain embodiments of geogrids in accordance with the invention be at least about 60% or at least about 65%, or at least about 70% or at least about 75%, or at least about 85%.

Uniax geogrids in accordance with the invention are preferably such that the stretch ratio at the mid-points of the rib segments (i.e. half-way between the centres of the two adjacent junctions) as measured along the length of the rib segments is in the range 5:1 to 12:1, more preferably 7:1 to 10:1 and even more preferably 7.5:1 to 9.5:1, e.g. about 9:1. The stretch ratio at the mid-points of the junctions is preferably at least 55% (as measured in the length direction of the rib segments) of that at the mid-point of the adjacent rib segments. Thus, for example in the case where the stretch ratio at the mid points of the rib segments as measured along the length of the rib segments is in the range 7.5:1 to 9.5:1, it is preferred that the stretch ratio (in the same direction) at the mid-points of the junctions is in the range 5:1 to 6:1. Thus for a typical case in which the stretch ratio at the mid-point of a rib segment is about 9:1, the stretch ratio at the mid-point of the adjacent junction is at least 5.0:1 as measured in the longitudinal direction of the rib structure. This is in complete contrast to prior art uniax geogrids in which the correspondingly measured stretch ratio at the mid-point of the junction is about 1:1 (i.e. substantially no orientation across the junction).

For the production of uniax geogrids in accordance with the invention, the width of the bar forming zones of the sheet starting material needs to meet two requirements. The first is that the width must permit orientation (in the stretching direction) to pass across the junctions connecting two adjacent rib segments. In other words, the bar forming zones should not be so wide that act as "orientation blockers" to prevent orientation going across the junctions, as they do during production of conventional uniax geogrids. The second is that the width should not be so narrow such that any portion of the bar structure (and particularly the bar segments) has a stretch ratio in the second direction greater than 1.5. If the width of the bar forming zones is too narrow then the tendency of the stretching operation in the first direction to produce oriented rib segments of lesser width (in the second direction) than the rib forming zones will result in stretching of the bar segments as occurs in accordance with the disclosure of GB-A-2124965 such that stretch ratios along their length will exceed 1.5.

Thus, to summarise, the width of the bar forming zones in plastics sheet starting materials employed in the invention falls in a window where (considering starting materials of the same composition and thickness) the width is (i) less than for the case of producing a comparable uniax geogrid in which there is substantially no orientation across the junctions (as measured along the rib structures) and substantially no orientation of the bar structures as measured along the length thereof, but (ii) greater than the case where the mesh structure has orientation along the bar structure as contemplated in GB 2 124 965.

Following on from the above discussion, in order to achieve the orientation across the junction (in the direction of the length of the rib structures) during the stretching process, it is necessary for the bar structure forming zones in the sheet starting material (and consequently the width of the resulting bar structures in the uniax geogrid) to have a width less than is the case for production of a comparative uniax geogrid produced from the same type of sheet starting material (composition, thickness) which has holes of the same size and which is stretched to produce a geogrid with apertures of the same length and the same or similar stretch ratio at the mid points of the rib segments (as measured in the length direction of the rib structures). Thus, a uniax geogrid produced in accordance with the prior art may have bar structures with a width of 16 to 20 mm (see above) whereas in a comparable geogrid in accordance with the invention the corresponding width for a comparable geogrid is more likely to be in the range of 6 to 14 mm, more preferably 8 to 12 mm, and most preferably 10 to 12 mm, e.g. about 11 mm.

Generally the distance between the centres of two adjacent bar segments (as measured along the longitudinal extent of the rib structures) is in the range 200 to 500 mm, e.g. 225 to 300 mm.

As indicated, the bar structures are such that their overall stretch ratio as measured along the lengths thereof is a maximum of 1. This implies that, during manufacture of the geogrid by a method in accordance with the second aspect of the invention, the geogrid has a width (i.e. as measured in the second direction) which is no greater than that of the plastics sheet starting material. Ideally however the overall stretch ratio of the bar structures along the length thereof is not less than about 0.80 (resulting from some contraction in width) and is ideally in the range of about 0.80 to about 0.9, more preferably about 0.83 to about 0.87, e.g. about 0.85. However even though the overall stretch ratio of the bar structures as measured along the length thereof is a maximum of 1, there may be individual locations along the length of the bar structures (usually along the bar segments) where the stretch ratio (in the second direction) is greater than 1, but no greater than 1.5. Stretch ratio values along (and measured in the direction of) the length of the bar structure less than 1 then represents a compression rather than a stretch and is most likely to be a value encountered in a junction of the bar structure rather than in a bar segment for which the stretch ratio is preferably from about 1:1 to 1.5:1. Preferably all locations along the length of the bar structures have a minimum orientation of 0.8 in the second direction. It is particularly preferred that all locations along the length of the bar structures have an orientation in the range 0.85 to 1.15.

Uniax geogrids in accordance with the invention can have improved strength properties and efficiencies (in terms of strength of geogrid per unit weight of polymer constituting the geogrid) as compared to comparable prior art uniax geogrids and it will be appreciated from the above that these improved properties result from the fact that the rib segments are oriented along their lengths (the orientation at the mid-point of the junctions most preferably being at least 55% of that at the mid-point of the rib segments) and have a significantly lower amount of un-oriented polymer located in the transverse bar segments, as compared to prior art uniax geogrid produced from a plastic sheet starting material of the same thickness.

Furthermore, the uniax geogrids of the invention have a number of advantages as compared to the biaxially orientated mesh structures disclosed in GB-A-2 124 965. In particular, the thicker bar structures (in the uniax geogrids of the present invention) can assist with reduction in creep strain rate (and provide longer times to rupture). Additionally, the ticker and less oriented bar is more suitable for the use of conventional mechanical connectors. Furthermore, the thicker and stiffer bar structure resists width reduction forces in production and helps maintain "perpendicularity" to ensure that the bar structures remain perpendicular to the stretch direction.

The method of the second aspect of the invention for producing the uniaxial geogrid of the invention involves stretching the plastics sheet starting material in one direction (which can be considered to be the "machine direction" (MD) in a production process) whilst preferably restraining movement of the material in the direction transverse thereto so as to inhibit or prevent reduction in width. Preferably there is a maximum of 15% width reduction during the stretching operation. The MD stretch can be carried out using stretching rolls and results in strand forming zones of the starting material (i.e. zones between adjacent holes in rows extending in the transverse direction) being stretched out to form the strands or rib segments. Typically, the actual material strain rate during the stretching process is 1 to 20 m/min. Without width restraint, it has been found that the increased orientation levels (as measured along the length of the rib structures) in the junctions not only promotes loss of width but also distortion around the positions where the rib segments meet the junctions. Additionally, restraining width reduction in the second direction (i.e. transverse to the stretch direction) ensures that orientation is wholly directed along the length of the product where it is actually required.

Plastics sheet starting materials employed in the present invention may be of any suitable plastics material, e.g. polypropylene or high density polyethylene, though different plastics materials have different stretching behaviours. Preferably, the starting material is strictly uniplanar, meaning that the material is symmetrical about a median plane parallel to its faces. In general, a uniplanar starting material will give a uniplanar structure when stretched. A strictly uniplanar starting material can be produced by extruding the starting material and punching. However satisfactory results can be obtained with any substantially uniplanar starting material, meaning that the material does not deviate so much from strict uniplanarity that orientation is not comparable on each face of the product.

Typically, the plastics sheet starting material will have a thickness of 1 mm to 10 mm, more preferably 2 mm to 8 mm, even more preferably 3 mm to 5 mm, e.g. about 4 mm but thicker (than 10 mm) sheet starting material may be used with only the stretching equipment serving as a practical limitation.

The holes in the starting material may be through-holes or blind holes. If the holes are blind, the film or membrane in the hole will either rupture on stretching, or may remain as a thin membrane. The holes can be formed by punching them out from the starting material, as disclosed in U.S. Pat. No. 4,374,798, or can be formed by extrusion as disclosed in U.S. Pat. No. 5,053,264, or can be formed by suitable embossing, or in any other appropriate manner.

The holes in the plastics sheet starting material are preferably arranged so that the centres of the holes lie on a notional rectangular grid. The holes are preferably elongate in the first direction (i.e. the stretching direction). The ends of the elongate holes may be flat or radiused, most preferably flat. If flat the ends may be connected to the sides of the holes by radiused corners. Most preferably, the elongate holes are symmetrical about their longitudinal axis and are "waisted" so as to have a narrower width at an intermediate region than that at the end regions so as to have, in effect, a waisted appearance. As disclosed in GB 2 174 332 the configuration of such holes enables control of levels of orientation in the final product. Other configurations of holes are however possible. Thus, for example, the holes may be generally elliptical with all portions being wider along the length of the holes than at their ends.

The preferred configuration of hole (as indicated in the previous paragraph) is one which:
(a) is elongate;
(b) is symmetrical about its longitudinal axis;
(c) has flat (linear) ends;
(d) has radiussed (convex) corners; and
(e) is of narrower width at an intermediate region than that of the end regions.

Preferably the hole has a length of 20-40 mm (e.g. 20-30 mm). Preferably the radius of the corners is in the range 3-5 mm. The maximum width of the hole is preferably in the range 9-13 mm with the waisting at each side preferably being in the range 0.3 to 0.8 mm.

In the starting material to be stretched, the holes are preferably arranged such that the distance between adjacent ends of two adjacent holes in the first direction is in the range 6 mm to 14 mm, more preferably 8 mm to 12 mm, most preferably 10 mm to 12 mm, e.g. about 11 mm. The closest distance between two adjacent holes in the second direction will be about 10 mm to about 18 mm.

We have established that the corner radius of the holes can have a significant effect on tensile and creep properties of the final geogrid structure. Generally speaking, the larger the corner radii the higher will be the tensile strength of the resulting geogrid but with the characteristic that (when tested under a static load) the geogrid has faster and higher ultimate creep strain, which causes faster rupture times which is a disadvantage. The converse is true in that smaller corner radii give lower tensile strength, lower creep strain rates and ultimate strains but with longer rupture times. The preferred radius of 3-5 mm quoted above provides a balance for these properties, with preferred values being towards the lower end of the range.

Improvements in creep properties can also be obtained as a result of the actual material strain rate during the stretching process to produce the final geogrid. More particularly, we have established that geogrids produced at higher actual material strain rates achievable on a standard uniax geogrid production line have improved creep properties compared to geogrids produced in the laboratory at lower actual material strain rates from the same sheet starting materials. This is demonstrated in the Examples below. Ideally, the actual material strain rate during the stretching process is 2 to 12 m/min., more preferably 5 to 10 m/min.

Uniax geogrids in accordance with the invention may be used in a conventional way to strengthen a particulate material for the purposes of a geoengineering construction, e.g. an embankment or a modular block retaining wall. The term "particulate material" includes soil, aggregate, rocks, stones, gravel, stand, earth, clay, aggregate held by a binder such as asphalt or cement, concrete, or any other particulate or cohesive material used in geotechnical engineering or building.

The invention will be further described by way of example only with reference to the accompanying drawings, in which:

FIG. 1 is a plan view of a portion of a uniaxially oriented geogrid in accordance with the invention;

FIG. 2 is a plan view of a portion of a starting sheet material used to produce uniaxially oriented geogrids in accordance with the invention and comparative uniaxially oriented geogrids (depending on the value of d shown in FIG. 2), FIG. 2 being subdivided into notional regions which, subsequent to uniaxial stretching of the starting sheet material to produce a geogrid, give rise to component parts of the geogrid;

FIG. 3 is a detail of a hole configuration for use in producing a geogrid in accordance with the invention;

FIGS. 4(a) and (b) show stretch ratio analyses of a rib segment of a comparative geogrid (FIG. 4(a)) and a geogrid in accordance with the invention (FIG. 4(b));

FIGS. 5(a) and (b) respectively show geogrids in accordance with the invention, produced without lateral restraint and with such restraint;

FIGS. 6(a) and (b) show details of the junctions of the products of the geogrids depicted in FIGS. 5(a) and (b) respectively;

FIG. 9 is a graph showing the result of a "Creep Test" carried out on the geogrid shown in FIG. 8.

Figure 1:
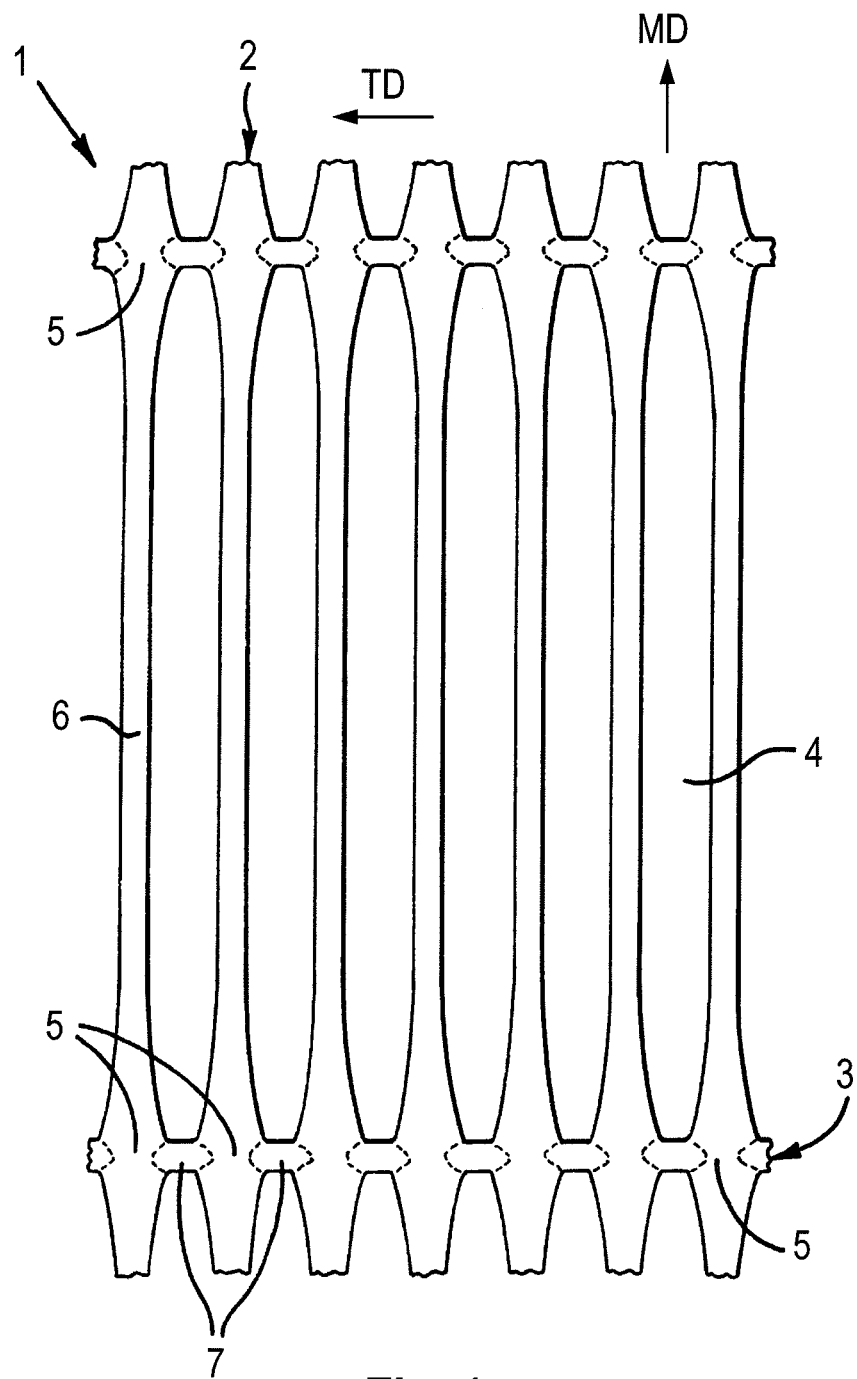

FIG. 1 illustrates a portion of a uniaxially oriented geogrid 1 in accordance with the invention which has been produced by stretching a plastics sheet starting material (see FIG. 2 and related description below) in a single direction MD as indicated by the arrow in FIG. 1 (MD being an abbreviation for "machine direction"), while restraining the sheet starting material in the transverse direction TD. The geogrid 1 comprises rib structures 2 which extend generally parallel to the machine direction MD. The rib structures 2 are transversely spaced from each other and connected at regularly spaced intervals by bar structures 3 extending in the TD direction whereby a plurality of longitudinal extending, elongate apertures 4 are defined in the geogrid 1. As further shown in FIG.

1, the rib structures 2 and bar structures 3 meet at junction regions 5 of the geogrid 1. Each rib structure 2 is continuous throughout the geogrid 1 as are the bar structures 3. Thus the junctions 5 are considered simultaneously to be both part of a rib structure 2 and a bar structure 3. As represented in FIG. 1, each rib structure 2 is comprised of an alternating arrangement of rib segments or strands 6 and junctions 5 whereas each bar structure 3 is comprised of an alternating arrangement of junctions 5 and bar segments 7.

Whilst in overall appearance the geogrid 1 may appear similar to conventional uniaxial geogrids also produced by stretching plastics sheet starting materials it differs significantly therefrom with regard to orientation of the rib structures 2 in the MD direction. More particularly, orientation (in the MD direction) in the rib segments 6 extends across junctions 5 connecting two adjacent rib segments 6. In accordance with the preferred embodiments of the invention, the stretch ratio at the mid-point of the junction 5 as measured in the length direction (MD) of the rib structures is at least about 55% of the stretch ratio of the adjacent rib segment 6 (again measured in the length direction thereof). The mid-point of the junction 5 is its mid-point as measured in the direction of the length of structures 2 and also its mid-point in the length direction of the bar structures 3. The mid-point of the rib segment 6 is halfway between the mid-points of the two adjacent junctions 5. The bar structures 3 are such that, along their length thereof (i.e. in the TD direction), they have an overall stretch ratio which is a maximum of 1 (more preferably 0.85 to 0.90) with no point along the length of the bar structures having an orientation (in the second direction) which is greater than 1.5. In accordance with preferred embodiments of the invention, there is no orientation of the bar structures 3 in the MD direction.

Figure 2:
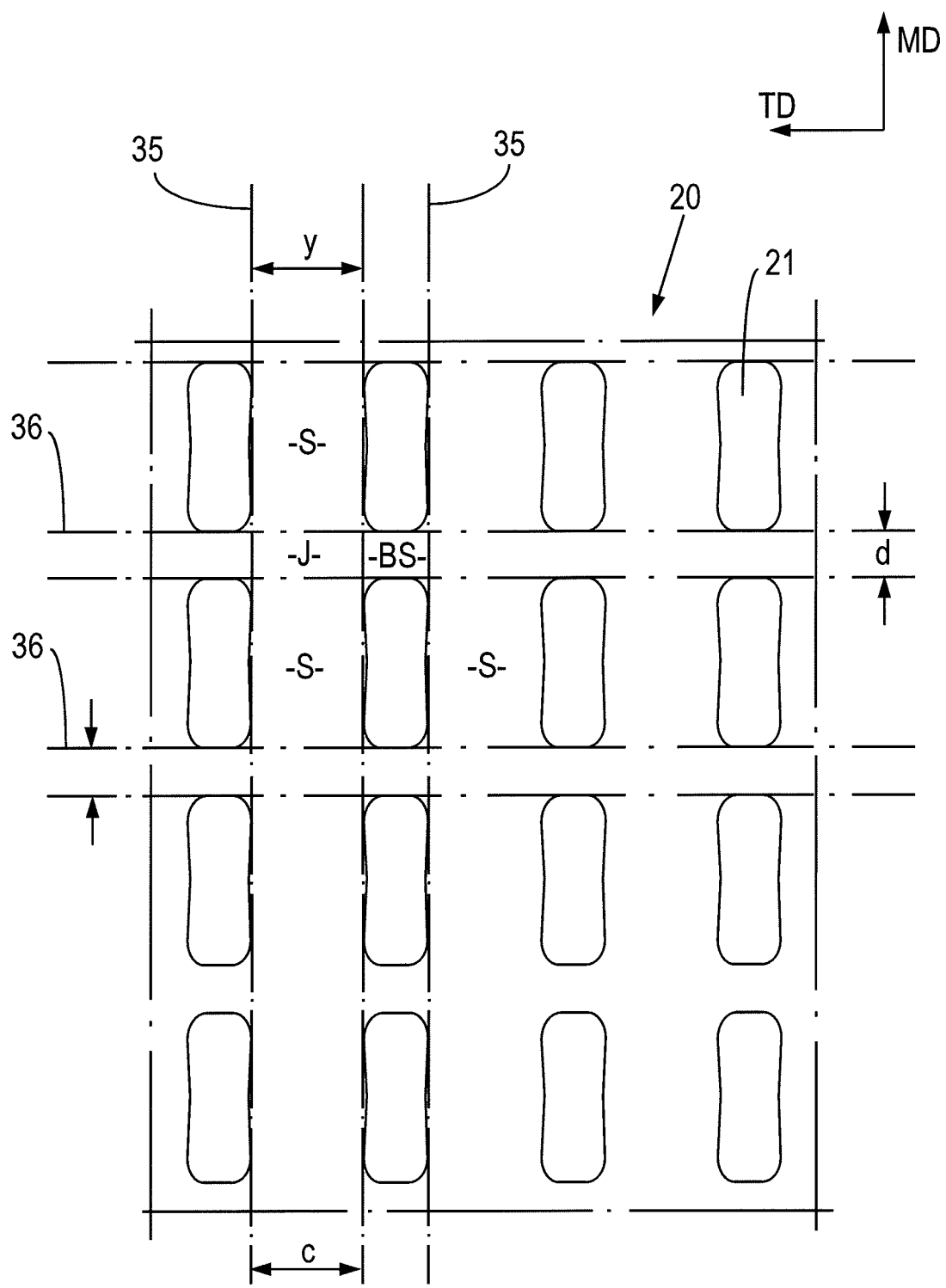

Geogrid 1 was produced from a starting material 20 for which a portion thereof is seen in the plan view of FIG. 2. The material 20 was a strictly uniplanar sheet of extruded high density polyethylene (HDPE) having planar parallel faces. The material 20 was formed with an array of elongate holes 21 arranged on a generally rectangular grid pattern whereby there are rows of holes 21 parallel to the direction marked TD in FIG. 2 and further rows parallel to the direction marked MD. Holes 21 are elongate and are arranged with their longitudinal axes extending in the MD direction. Each hole 21 has two generally flat ends connected (by rounded corners) to waisted sides. The hole is shown in more detail in FIG. 3, the hole is elongate with flat (linear) ends, radiused corners and waisted sides. As depicted, the hole has a length X, corners of radius R, flat ends of length Y, a maximum width Z, and a minimum width W. Typical values for these parameters are as follows:

W=8-12 mm
X=20-30 mm
Y=2-7 mm
Z=9-13 mm
R=3-5 mm

FIG. 2 is marked with various lines to identify regions that will facilitate an understanding of the following description. More particularly, FIG. 2 has been annotated with lines 35 that are parallel to the machine direction MD and are tangential to the long sides of the holes 21. Additionally lines 36 are drawn parallel to the transverse direction TD and tangential to the ends of holes 21. Considering rows of holes 21 that are parallel to the transverse direction TD, strand forming zones S are defined, on the one hand, between any two adjacent holes 21 in such a row and, on the other hand, by the lines 36 that are tangential to the ends of these holes 21. Considering rows that extend in the direction MD, bar segment forming zones BS are defined, on the one hand, between the ends of two adjacent holes 21 and, on the other hand, by the lines 35 that are tangential to the sides of these holes. Junction forming zones J are formed as shown and more specifically alternate with the strand forming zones S in the direction MD and with the bar segment forming zones BS in the direction TD.

To produce the geogrid 1, the starting sheet material 20 is stretched in the direction MD whilst applying restraint in the direction TD to produce the final structure. During the stretching process, the strand forming zones S are stretched in the MD direction so as to produce the strands 6 in the final structure whereas the junction forming zones J give rise to the junctions 5 and the bar segment zones BS form the bar segments 7, it being appreciated that the holes 21 in the starting material produce the elongate apertures 4 in the final structure.

In accordance with the invention, the value of d, i.e. the spacing between the ends of two adjacent holes 21 in a row extending in the machine direction MD, is somewhat less than is the case for production of a comparative uniax geogrid produced from the same type of sheet starting material (composition, thickness) which has holes of the same size and which is stretched to produce a geogrid with apertures of the same length and the same or similar stretch ratio at the mid points of the rib segments (as measured in the length direction of the rib structures). For the purposes of the invention, the value of d (which it will be appreciated defines the "width" in the direction MD of the junction forming zones J and bar segment forming zones BS) is selected so that the stretching operation provides a degree of orientation in the MD direction across the junctions 5 such that the stretch ratio at the mid points of the junctions 5 is preferably at least 55% of that at the mid point of the adjacent rib segments 6. This is a much higher level of orientation of the junction than is obtained in the production of conventional uniax geogrids. This is due to the fact that the rather greater value of d in the starting material used for the production of such conventional geogrids makes it much more difficult to draw the junction forming zone J in the direction MD, with the result that the junction formed is of a "blocky" structure of (substantially) unoriented polymer.

Whilst it is the lower value of d used in the present invention which allows for orientation across the junction in the MD direction nevertheless the value of d is not so small that highly orientated bar structures are obtained, such as produced in accordance with the disclosure of GB 2124965 A.

Several non-limiting Examples of the invention are detailed below.

First Inventive and Comparative Examples

To illustrate the invention, a laboratory sample of a plastics sheet starting material of the type illustrated in FIG. 2 was prepared by punching the holes 21 in a strictly uniplanar sheet of extruded high density polyethylene (HDPE) having planar parallel faces. The sheet material had a thickness of about 4 mm.

Figure 3:
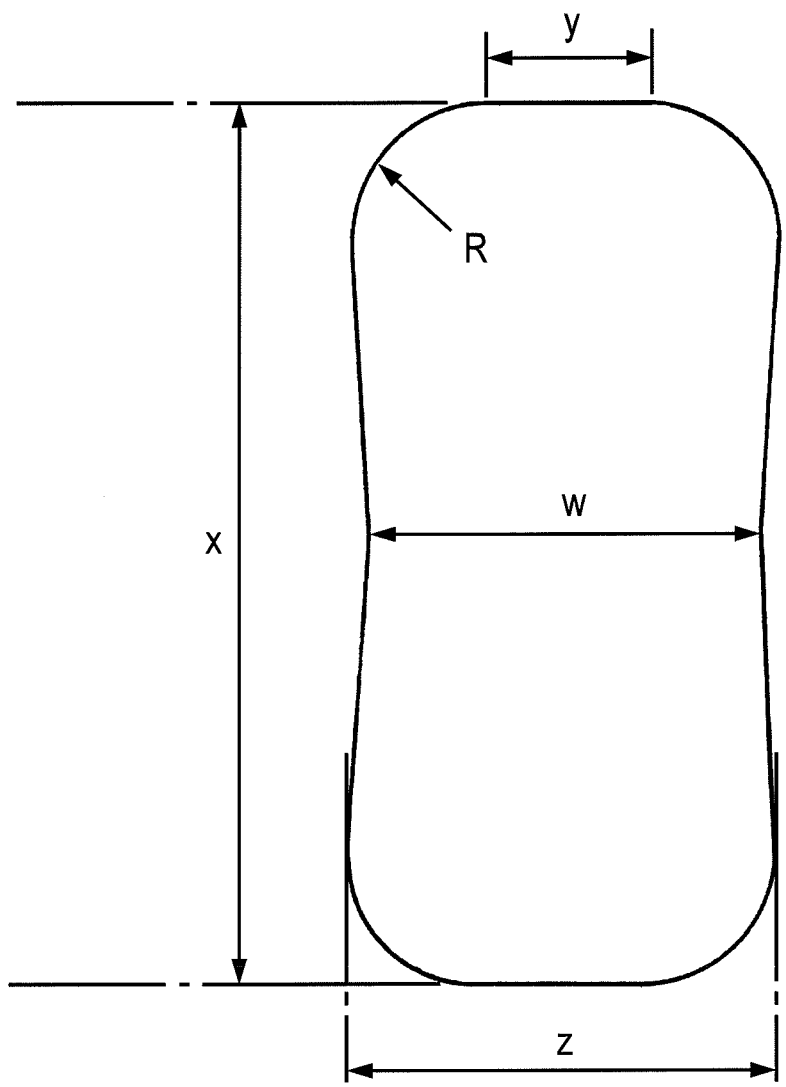

Each hole was as shown in FIG. 3 with the following dimensions:

W=8.5 mm
X=25.4 mm
Y=2.7 mm
Z=9.5 mm
R=3.175 mm

The spacing (depicted as d in FIG. 2 in the MD direction between two holes 21 was 6 mm. The closest distance (depicted in FIG. 2 as c) between adjacent holes in the TD direction was 15.9 mm.

One side of the material 20 was printed with a grid of "truth" lines for the purposes of analysing the extent to which the ultimate product had been stretched. Additionally, the side edges of the sample (the left and right hand sides as seen in FIG. 2) were severed at a plurality of locations by cuts extending (parallel to the lines 36) from the side edges centrally to the adjacent holes 21. This was to ensure that (given the relatively small size of the sample) there was no stretching of the side edge regions such as might influence stretching in the central region of the sample.

To produce the geogrid 1, the material 20 (with d=6 mm) was heated to a temperature of 105° C. and was stretched in the MD direction using an overall stretch ratio of about 7.5:1 to produce the geogrid in which the longitudinal distance (i.e. as measured in the direction MD) between the centres of two bar segments 7 was 235 mm. This procedure was conducted using parallel clamps engaging edges of the starting material 20 parallel to the lines 36 (see FIG. 2), the clamps then being drawn apart linearly. During the stretching operation, lateral restraint was applied in the TD direction by means of transverse bars rigidly connected to the side edges of the sheet starting material to prevent width reduction in that direction.

For the purposes of comparison, a geogrid in accordance with the prior art was produced using generally the same procedure as that adopted for the production of the geogrid 1 in accordance with the invention but with three differences. The first was that the distance d between two adjacent holes 21 in the MD direction was 16 mm rather than 6 mm as used for producing geogrid 1. Secondly, no lateral restraint was employed during the stretching operation. The third was that the overall stretch ratio was about 5.7 which (for this particular starting material) was required to achieve a distance of 235 mm in the MD direction between the centres of the bar segments (the same distance as in the geogrid 1). Lack of lateral restraint in this comparative process was not required in view of the significant width of the bar structure forming zones.

Figure 4A:
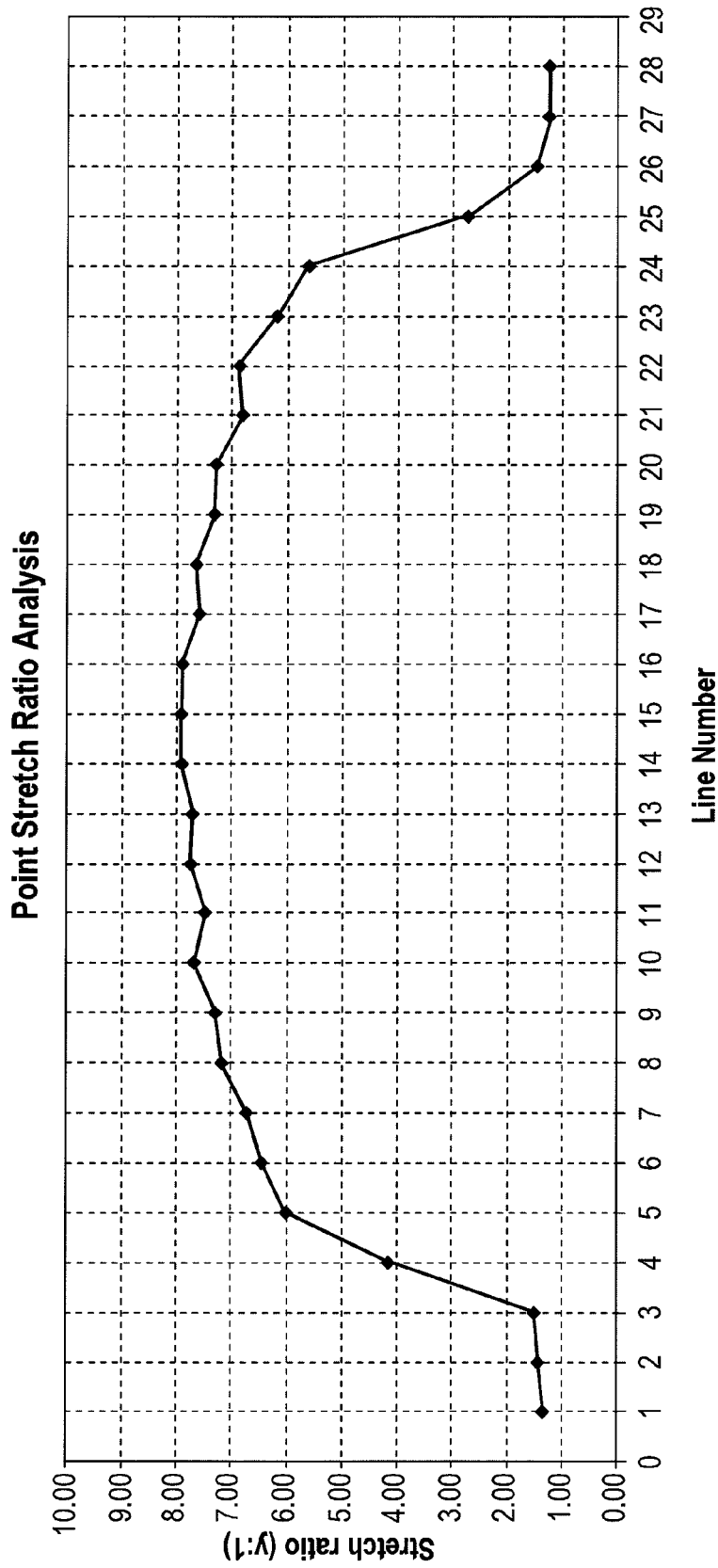
Figure 4A:
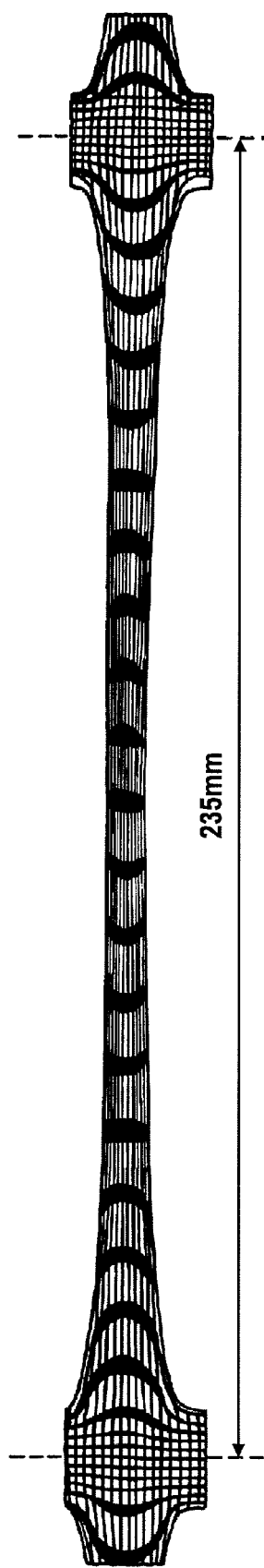

Comparisons of rib structures cut from central regions of the two products are shown in the stretch ratio analyses of the graphs shown in FIGS. 4(a) and (b) in which the graph labelled (a) is for the comparative geogrid and the graph labelled (b) is for the geogrid in accordance with the invention. In each case, the analysis was of the stretch ratio in the MD direction over a length from the centre of one junction to the next. In the graph of FIG. 4(a), lines 1 and 28 represent the centres of the junctions corresponding to the photograph of the rib section included in that Figure. For the graph of FIG. 4(b) the corresponding lines representing the centres of the junctions are 1 and 22. Stretch ratios were determined from a comparison of the distance between truth lines in the product and their original distance in the unstretched starting material 20.

As shown in FIG. 4(a) for the comparative geogrid the stretch ratio is high in the central region of the rib section (i.e. halfway between the centres of the two junctions) at about 8:1 but drops dramatically towards either end of the rib section. This decrease falls to 1:1 at the mid-point of the junction which represents completely unoriented polymer. The implication of this is that the orientation level along the length of rib structures of the final product is constantly oscillating from high in the centre of the rib segment to low at the mid-point of the junction.

Figure 4B:
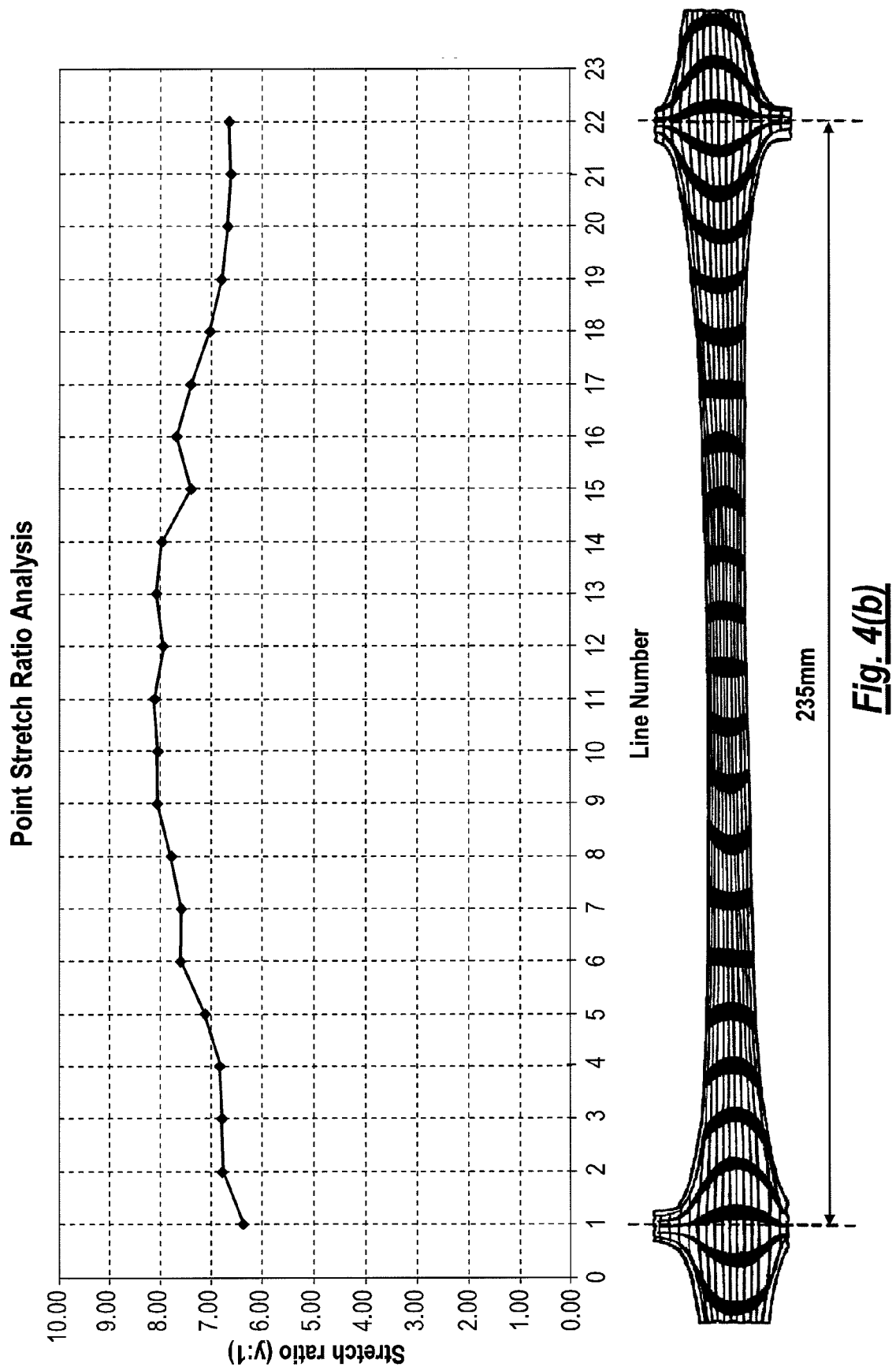

In contrast, FIG. 4(b) shows that in a product in accordance with the invention the orientation levels throughout the length of the rib section have been generally maintained. More particularly, the orientation at the mid-point of the junction is around 6.5:1 whereas at the mid-point of the rib segment it is around 8:1, both as measured in the longitudinal direction of the rib structure. Thus the orientation at the mid-point of the junction is just over 80% of that at the mid-point of the rib segment. As such, a high stretch ratio continues right through the junction providing an uninterrupted flow of molecularly oriented material without adversely affecting the section of bar that connects adjacent ribs. These sections remain unoriented. Furthermore it will be appreciated that the difference between the peak stretch ratio (about 8:1) in the centre of the rib and at the centre of the junction (around 6.5:1) is now only 1.5 in comparison with a difference of about 7 for the comparative product.

It is clear that the large amounts of low and un-oriented polymer in the bar structures of the comparative geogrid have been greatly reduced in the geogrid of the invention.

In the case of the comparative product obtained above, the bar width (as measured in the direction MD) is about 16 mm. With this width, the bar effectively acts as an orientation 'blocker' as the high bar width value promotes the widening (flaring) of the rib as it enters the TD bar area and eventually extends the areas of the bars (by widening the bar segments) between the ribs in an uncontrolled and undesirable way before the orientation has gone through the TD bar. Also, the reduction in width due to MD orientation, which can be a reduction of the order of 10-20%, further promotes this effect particularly in the outer regions of the product. In order to allow the orientation to progress through the TD bar area earlier in the stretching cycle the bar width needs to be reduced in order to offer less resistance to the molecular orientation of the polymer. The aim of the invention is to try to control the levels of orientation such that the large variations between the high values at the centres of the ribs and the low values at the centres of the TD bars are smoothed out to a more uniform arrangement to produce a relatively constant stretch ratio along the whole product.

In the product produced by the above procedure in accordance with the invention, the bar width was about 6 mm. Although other values may be employed (see below), the value of the bar width addresses two issues. Firstly it allows the orientation to advance through the TD bar zone and secondly it also reduces the amount of 'inactive' polymer contained in the TD bars after stretching. There is however a disadvantage to this scenario in that the increased orientation levels in the bar zones promote more loss of width and subsequently more distortion around the positions where the ribs enter the TD bar. This is counteracted in the above Example by fully restraining the product during the stretching process so that the width before stretching is exactly that same as the width after stretching. In this way two important effects are allowed to occur. Firstly the overstretching of the inter-rib (sections between ribs along the TD bar) areas is eliminated and secondly and more importantly with no loss of width the orientation is wholly directed along the length of the product where it is actually required.

A comparison of the physical properties of the two geogrids (inventive and comparative) is given in Table 1 below.

TABLE 1

| Sample | Starting sheet thickness (mm) | Bar to bar centers (mm) | Overall stretch ratio | Weight per square meter (A) (kg/m$^2$) | Strength per linear meter (B) (kN/m) | Efficiency, (B/A) (kNm/kg) |
|---|---|---|---|---|---|---|
| Comparative | 4.05 | 235 | 5.69 | 0.614 | 82.5 | 134.4 |
| Invention | 4.05 | 235 | 7.48 | 0.369 | 92 | 249.3 |

A number of differences are immediately obvious. The reduction in the width of the bar segments in the product of the invention as compared to the comparative sample (resulting from the lower value of d) has removed much of the 'inactive' polymer while the increased stretch ratio combined with the width restraining technique has allowed the orientation to proliferate through the junction in a controlled manner. This has resulted in a modest increase in absolute tensile strength but more importantly a very high increase in the strength per unit weight of the product (some 85% higher).

Second Inventive Examples

Effect of Restraint in TD Direction

The procedure described above for producing a geogrid in accordance with the invention from a starting material 20 with d=6 mm was repeated and (for the purposes of comparison) also carried out in a modified form in which no lateral restraint in the TD direction was applied during the stretching operation.

Figure 5:
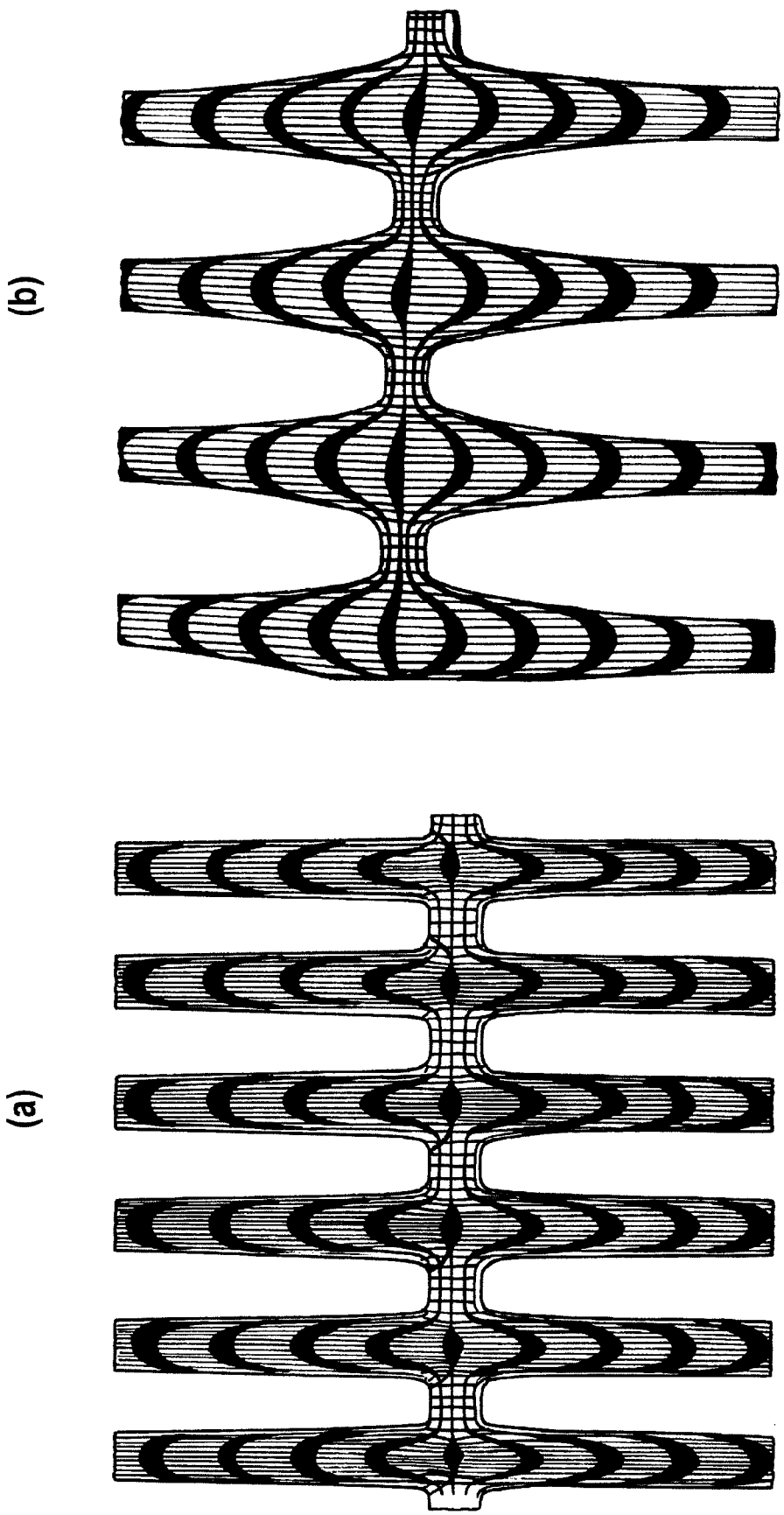
Figure 6:
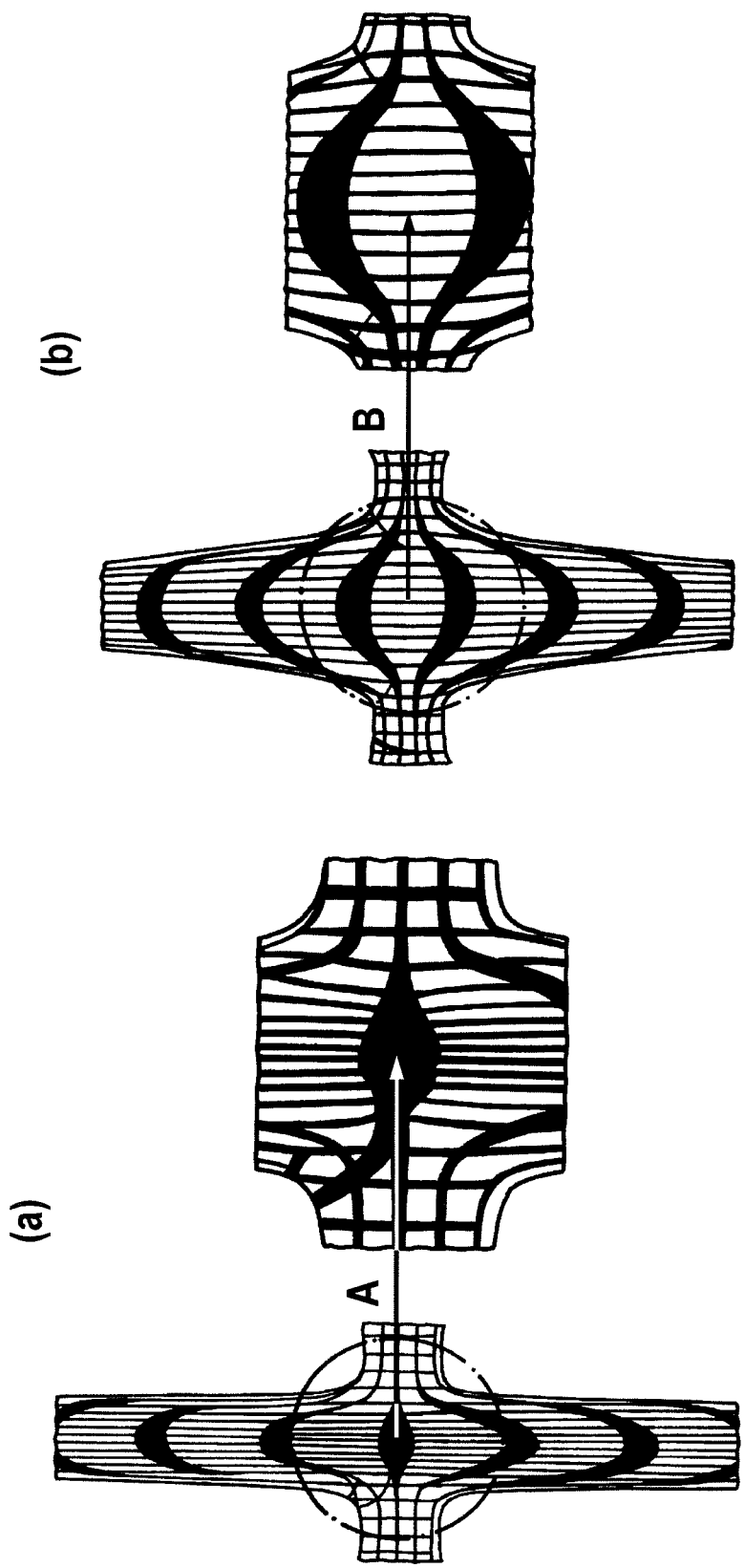

The results are shown in FIGS. 5 and 6, in each of which the figures designated (a) shows a sample produced without lateral restraint and the figure designated (b) shows a sample produced with lateral restraint.

FIG. 5 shows two samples made from the same sheet thickness, punch/pitch, and overall stretch ratio. Sample (a) was stretched without any control of its lateral contraction while sample (b) was fully restrained such that the starting width was the same as the finishing width. It can be clearly seen that the entry of the ribs into the junction in sample (a) has a greatly reduced 'flaring' effect compared to the same position in sample (b). This is due to the contraction of the width of sample (a) during the stretching operation and results in greater MD orientation levels through the junction but also causes the negative orientation in this region in the TD direction. FIGS. 6(a) and 6(b) are magnified views of portions of respectively the geogrids shown in FIGS. 5(a) and 5(b). FIG. 6 shows the orientation effect in more detail with the TD orientation having a value of about 0.4:1 in region A of the product shown in FIG. 6(a) and 1:1 in region B of the product shown in FIG. 6(b). Thus, in preferred embodiments of the invention, width restraint is employed during the stretching) process.

Third Inventive Example

A series of samples were produced from starting materials with different configurations of holes. This was to evaluate the effect of the hole shape on the short term tensile properties of the resulting products. Although there were some variations in hole length and width these were effectively negated by ensuring that the MD and TD pitches were adjusted to produce a constant TD bar width of 6 mm and a constant rib forming width of 16.38 mm in all cases. The starting sheet thickness was about 4 mm and the overall stretch ratio was constant at 7.5:1 for all samples. All the samples were tensile tested using single ribs held in wedge action knurled jaws with a strain rate of 20% of the gauge length as measured in mm/min movement of the cross-head of the testing machine.

The hole configurations tested were:
(1) as in First Inventive Example above (0.5 mm waisting at each side, flat ends, radiussed corners, R=3.175 mm)
(2) 0.75 mm waisting at each side, flat ends, radiussed corners (R=3.175 mm)
(3) 0.5 mm waisting, full radius (semi-circular) ends (R=4.76 mm)

The results are shown in Table 2 below which also includes the corresponding properties for a standard production uniax product.

TABLE 2

Tensile strength improvements.

| Sample | Rib starting width (mm) | Bar to bar centers (mm) | Overall stretch ratio | Weight (g/m$^2$) | Failure load (kN) | QC strength (kN/m) | Increase in QC strength (%) |
|---|---|---|---|---|---|---|---|
| Comparative | 16.38 | 235 | 5.69:1 | 614 | 1.78 | 82.5* | 0 |
| (1) | 16.38 | 235 | 7.5:1 | 369 | 2.34 | 94.4** | 14.4 |
| (2) | 16.38 | 235 | 7.5:1 | 384 | 2.35 | 95.0** | 15.1 |
| (3) | 16.38 | 235 | 7.5:1 | 369 | 2.47 | 99.7** | 20.8 |

*Based on 46.45 ribs/m
**Based on 40.37 ribs/m

Fourth Inventive Example

Two geogrids in accordance with the invention were prepared and tested for their "Creep Properties".

Both geogrids were produced from a plastics sheet starting material as described in the First Inventive Example above. One geogrid was a laboratory sample produced in accordance with the procedure as generally described in that Example but using an actual material strain rate of 0.6 m/min.

The other geogrid was produced on a full-scale production line (used for the manufacture of Uniax grids) at an actual material strain rate of 8 m/min.

Figure 7:
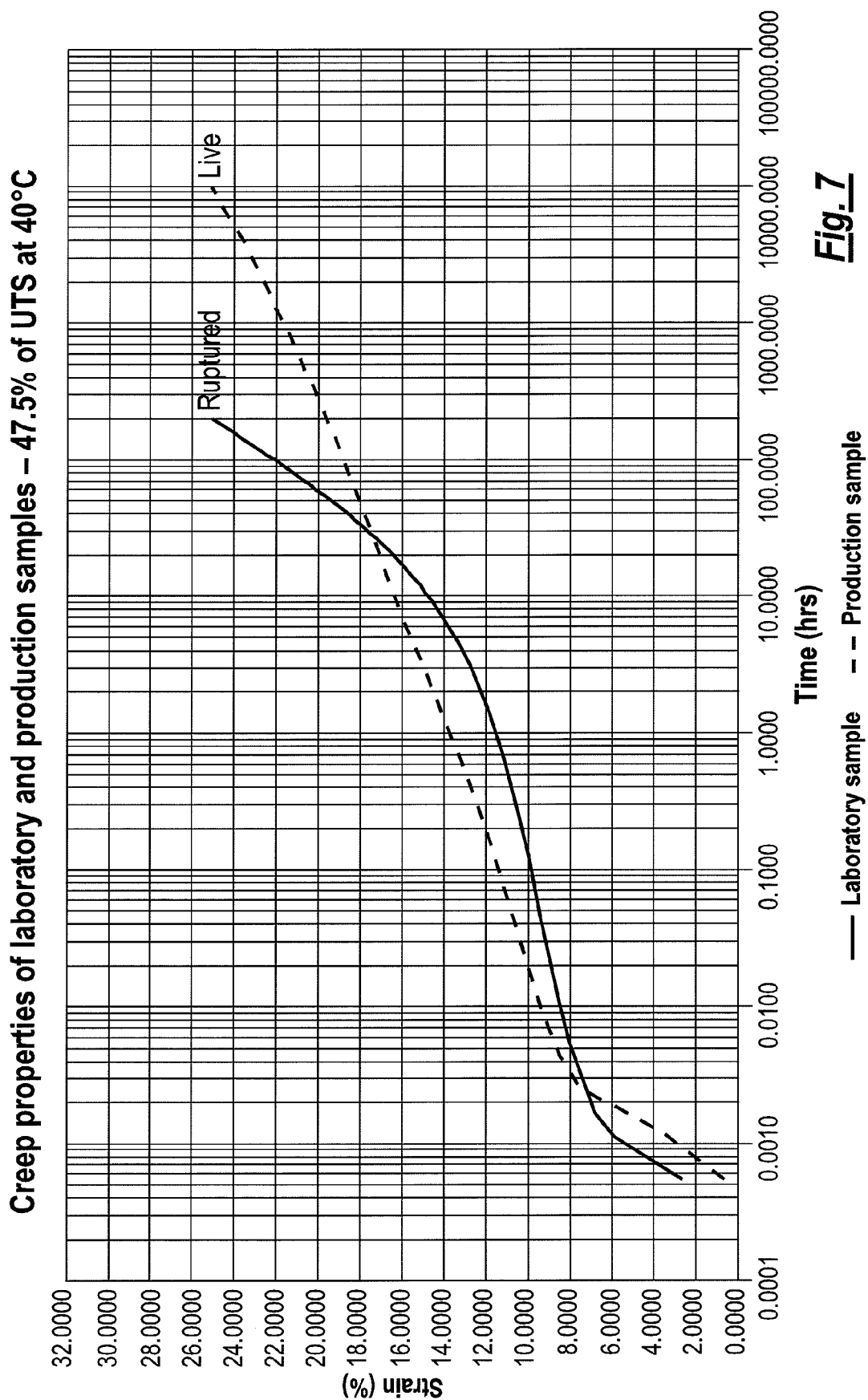
FIG. 7 is a graph showing the results of Creep Tests carried out on two geogrids produced in accordance with the invention but at different material strain rates.

Both samples were subjected to a 40° C. static creep test using a load corresponding to 47.5% of their Ultimate Tensile Strength (UTS). The results are shown in FIG. 7 from which it can be seen that the sample produced on the full-scale production machine (at an actual material strain rate of 8 m/min) had superior creep properties to the laboratory-produced sample as it has a longer time to rupture. More specifically, the laboratory-produced sample ruptured after about 200 hours whereas the production sample was still "live" after about 10,000 hours, which obviously represents a significant improvement in time.

Fifth Inventive Example

A plastics sheet starting material of the type illustrated in FIG. 2 was prepared by punching the holes 21 in a strictly uniplanar sheet of extruded high density polyethylene (HDPE) having planar parallel faces. The sheet material had a thickness of about 4 mm. Each hole was generally as shown in FIG. 3 with the following dimensions:
W=11.7 mm
X=25.5 mm
Y=5.9 mm
Z=12.7 mm
R=3.175 mm The MD pitch of the holes was 36.4 mm and the TD pitch was 25.4 mm. The apertured plastics sheet was stretched using the same technique as described in the "First Inventive" Example described to give an overall stretch ratio of 7.5.

Figure 8:
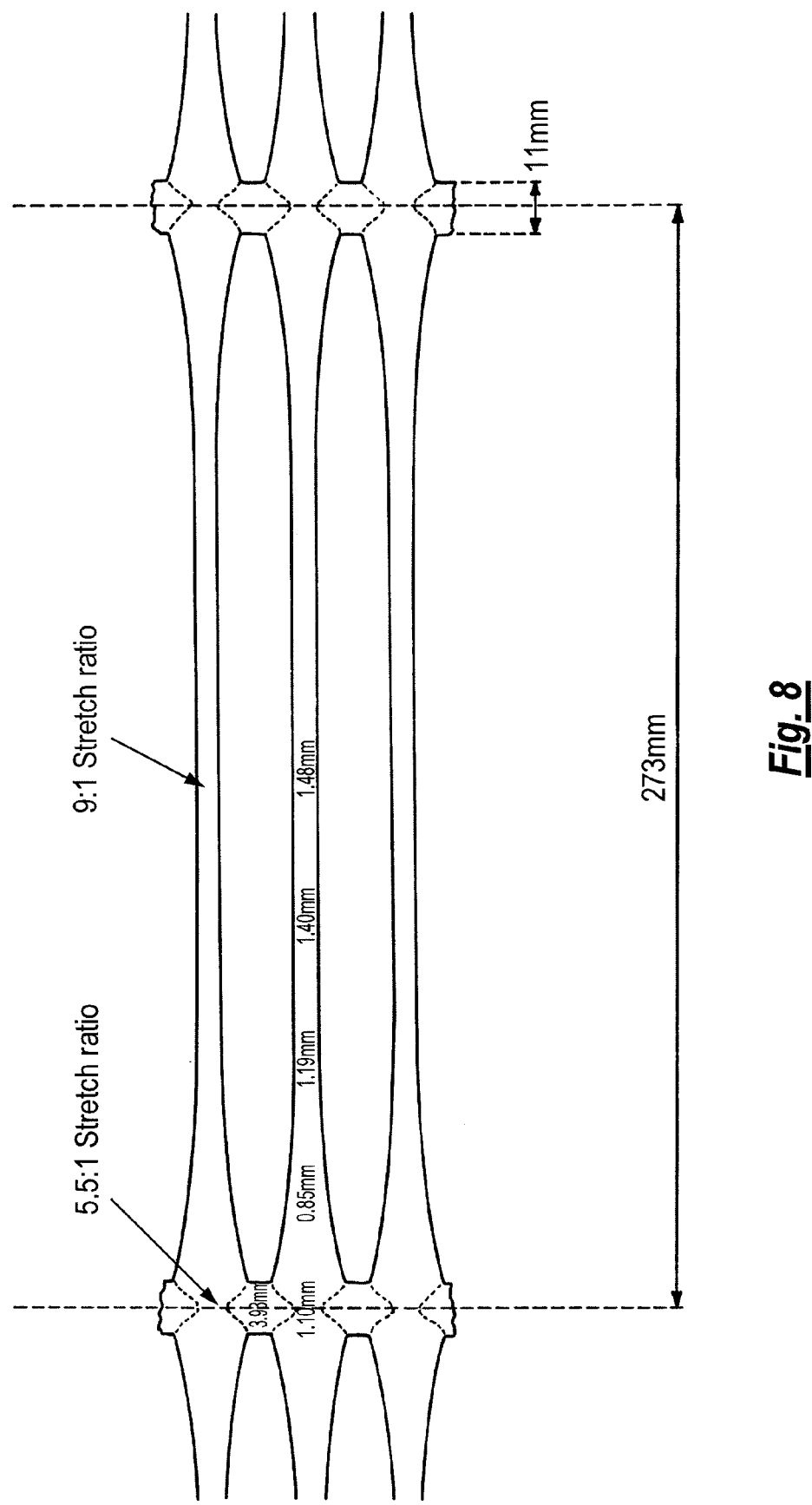
FIG. 8 is a plan view of a further embodiment of a uniaxially oriented geogrid in accordance with the invention as produced in accordance with the Fifth Inventive Example below.

The product obtained is shown in FIG. 8. As shown in that Figure the rib structures of the geogrid were such that, as measured along the longitudinal extent thereof, the stretch ratio at the mid point of the rib segments was 9:1 and that at the mid point of the junctions was 5.5:1 (i.e. about 61% of that at the mid point of the adjacent rib segment). The bar segments had a width of about 11 mm and (although not shown in FIG. 8) the bar structures had a stretch ratio throughout their entire length of about 1:1. Thickness measurements are also shown in FIG. 8.

A product of the type shown in FIG. 8 was subjected to a 50° C. static creep test using a load corresponding to 45% of its Ultimate Tensile Strength (UTS). The results are shown in FIG. 9 from which it will be seen that rupture only occurred after 500 hours under the exacting conditions of this creep test.

The invention claimed is:

1. A one-piece plastics material mesh structure produced by stretching a plastics sheet starting material formed with an array of holes wherein the mesh structure comprises a plurality of generally parallel rib structures extending longitudinally in a first direction parallel to the stretch direction and a plurality of generally parallel bar structures extending in a second direction transverse to the rib structures, said rib structures and said bar structures being interconnected by junctions at spaced locations along their respective lengths whereby the rib structures are sub-divided along their length into alternating junctions and rib segments and the bar structures are sub-divided along their lengths by alternating bar segments and junctions, wherein:
(a) the rib structures are such that the rib segments are oriented in the first direction along their lengths and orientation in the first direction extends across the junctions connecting two such oriented rib segments,
(b) the bar structures are such that their overall stretch ratio in the second direction is a maximum of 1 and all locations along the length of the bar structures have a maximum stretch ratio of 1.5 in the second direction,
(c) as measured in the first direction, the stretch ratio at the midpoint of the rib segments is in the range 7.5:1 to 9:1, and
(d) the rib structures are such that, as measured in the first direction, the stretch ratio at the midpoints of the junctions is at least about 60% of that at the midpoint of the adjacent rib segments.

2. The mesh structure as claimed in claim 1 wherein the rib structures are such that, as measured in the first direction, the stretch ratio at the midpoints of the junctions is at least about 65%.

3. The mesh structure as claimed in claim 1 wherein as measured in the first direction, the stretch ratio at the midpoint of the rib segments is about 9:1.

4. The mesh structure as claimed in claim 1 wherein as measured in the first direction, the stretch ratio at the midpoints of the junctions is 5:1 to 6:1.

5. The mesh structure as claimed in claim 1 wherein, as measured in the second direction, the overall stretch ratio of the bar structures is about 0.8 to about 0.9.

6. The mesh structure as claimed in claim 1 wherein all locations along the length of the bar structures have a minimum stretch ratio of about 0.8 in the second direction.

7. The mesh structure as claimed in claim 6 wherein all locations along the length of the bar structures have a stretch ratio in the range of about 0.85 to about 1.15 in the second direction.

8. The mesh structure as claimed in claim 1 wherein the mesh structure is a geogrid.

9. The mesh structure as claimed in claim 1 wherein, as measured in the first direction, the distance between the centres of two adjacent bar segments is between about 20 cm and about 50 cm.

10. The mesh structure as claimed in claim 1 wherein, as measured in the first direction, the bar segments have a width of between about 6 mm and about 14 mm.

11. The mesh structure as claimed in claim 10 wherein, as measured in the first direction, the bar segments have a width of between about 8 mm and about 12 mm.

12. The mesh structure as claimed in claim 11 wherein, as measured in the first direction, the bar segments have a width of between about 10 mm and about 12 mm.

13. A one-piece plastics material geogrid produced by stretching in a first direction a plastics sheet starting material formed with an array of holes wherein the mesh structure comprises a plurality of generally parallel rib structures extending in the first direction and a plurality of generally parallel bar structures extending in a second direction transverse to the rib structures, said rib structures and said bar structures being interconnected by junctions at spaced locations along their respective lengths whereby the rib structures are sub-divided along their length into alternating junctions and rib segments and the bar structures are sub-divided along their lengths by alternating bar segments and junctions, wherein:
(a) the rib structures are such that, as measured in the first direction, the stretch ratio at the midpoints of the junctions is in the range 5:1 to 6:1 and the stretch ratio at the midpoint of the rib segments is in the range 7.5:1 to 9.5:1,
(b) the bar structures are such that, as measured in the second direction, their overall stretch ratio is a maximum of 1 and all locations along the length of the bar structures have a maximum stretch ratio of 1.5 in the second direction,
(c) a distance between the centres of two adjacent bar segments is between about 200 mm and about 500 mm as measured in the first direction, and
(d) the bar segments have a width of about 6 mm to about 14 mm as measured in the first direction.

14. The geogrid as claimed in claim 13 wherein all locations along the length of the bar structures have a minimum stretch ratio of about 0.8 in the second direction.

15. The geogrid as claimed in claim 14 wherein all locations along the length of the bar structures have stretch ratio in the range of about 0.85 to about 1.15 in the second direction.

16. The geogrid as claimed in claim 13 wherein the rib structures are such that, as measured in the first direction, the stretch ratio at the midpoints of the junctions is about 5.5:1 and the stretch ratio at the mid-point of the rib segments is about 9:1.

17. The geogrid as claimed in claim 13 wherein, as measured in the first direction, the bar segments have a width of between about 8 mm and about 12 mm.

18. The geogrid as claimed in claim 13 wherein, as measured in the first direction, the bar segments have a width of between about 10 mm and about 12 mm.

19. The mesh structure as claimed in claim 1 wherein the stretching in the first direction is the only stretching operation employed in the production of the mesh structure.

20. A method of producing a one piece plastics material mesh structure comprising:
(i) providing a plastics sheet starting material having holes arranged on a regular grid pattern such that there are parallel first rows of holes in a first direction and parallel second rows of holes in a second direction transverse to the first direction, whereby said starting material has bar structure forming zones defined between the adjacent rows of second holes and rib structure forming zones defined between adjacent first rows of holes and (ii) stretching said material in the first direction to produce a mesh structure including a plurality of generally parallel, longitudinal rib structures extending parallel to the first direction and a plurality of generally parallel bar structures extending parallel to the second direction, said rib structures and bar structures being interconnected by junctions at spaced locations along their respective lengths whereby the rib structures are sub-divided along their length into alternating junctions and rib segments and the bar structures are sub-divided along their length into alternating bar segments and junctions, wherein the width in the stretch direction of the bar structure forming zones and the degree of stretch produce a mesh structure in which:
  (a) the rib structures are such that the rib segments are oriented in the first direction along their lengths and orientation in the first direction extends across the junctions connecting two such oriented rib segments,
  (b) the her structures are such that their overall stretch ratio in the second direction is a maximum of 1 and all locations along the length of the bar structures have a maximum stretch ratio of about 1.5 in the second direction,
  (c) as measured in the first direction, the stretch ratio at the midpoint of the rib segments is in the range 7.5:1 to 9.5:1, and
  (d) the rib structures are such that, as measured in the first direction, the stretch ratio at the midpoints of the junctions is at least about 60% of that at the midpoint of the adjacent rib segments.

21. The method as claimed in claim 20 wherein the holes are elongate in the first direction.

22. The method as claimed in claim 21 wherein the elongate holes are symmetrical about their longitudinal axis and are of narrower width at an intermediate region than at the end regions.

23. The method as claimed in claim 22 wherein the holes have a length of between about 20 mm and about 40 mm.

24. The method as claimed in claim 22 wherein the maximum width of the hole is in the range of about 9 to 18 mm.

25. The method as claimed in claim 22 wherein the waisting at each side in the range of about 0.3 to 0.8 mm.

26. The method as claimed in claim 22 wherein the elongate holes have flat or linear ends and have radiussed or convex corners.

27. The method as claimed in claim 26 wherein the radius of the corners is in the range of about 3 to 5 mm.

28. The method as claimed in claim 20 wherein the plastic sheet starting material has a thickness of between about 2 mm and about 12 mm.

29. The method as claimed in claim 28 wherein the plastic sheet starting material has a thickness of about 2 mm to about 10 mm.

30. The method as claimed in claim 20 wherein the material strain rate during the stretching process is about 2 to 12 m/min.

31. The method as claimed in claim 20 wherein the starting material is stretched such that all locations along the length of the bar structures have a minimum orientation of about 0.8 in the second direction.

32. The method as claimed in claim 31 wherein the starting material is stretched such that all locations along the length of the bar structures have an orientation in the range of about 0.85 to about 1.15 in the second direction.

33. The method as claimed in claim 20 wherein the distance between adjacent ends of two adjacent holes in a row in the first direction is in the range of about 6 mm to about 14 mm.

34. The method as claimed in claim 33 wherein the distance between adjacent ends of two adjacent holes in the first direction is in the range of about 8 mm to about 12 mm.

35. The method as claimed in claim 34 wherein the distance between adjacent ends of two adjacent holes in the first direction is in the range of about 10 mm to about 12 mm.

36. The method as claimed in claim 35 wherein the distance between adjacent ends of two adjacent holes in the first direction is about 11 mm.

37. The method as claimed in claim 20 wherein the closest distance between two adjacent holes in the second direction is about 10 mm to about 18 mm.

38. The method as claimed claim 20 wherein the stretching in the first direction is the only stretching operation employed in the method.

39. The method as claimed in claim 20 wherein the step of stretching said material in the first direction is performed under conditions such that there is a maximum of about 15% contraction in the second direction.

40. The method as claimed in claim 28 wherein the plastic sheet starting material has a thickness of about 4 mm.

* * * * *